United States Patent [19]
Sarmast et al.

[11] Patent Number: 5,393,128
[45] Date of Patent: Feb. 28, 1995

[54] CUSHIONED WHEEL AND COVER ASSEMBLY

[75] Inventors: Syed H. Sarmast, Northville; Gerald F. Herbert, Dearborn Heights; Charles F. Hodge, Plymouth, all of Mich.

[73] Assignee: Ford Motor Company, Dearborn, Mich.

[21] Appl. No.: 136,864

[22] Filed: Oct. 18, 1993

[51] Int. Cl.$^6$ .............................................. B60B 7/06
[52] U.S. Cl. .................. 301/37.34; 301/37.35; 301/37.1
[58] Field of Search ............... 301/37.1, 37.31, 37.32, 301/37.34, 37.35, 37.36, 37.38

[56] References Cited

U.S. PATENT DOCUMENTS

| | | |
|---|---|---|
| 2,159,881 | 5/1939 | Booth .................. 301/37.38 |
| 2,212,037 | 8/1940 | Lyon . |
| 2,736,610 | 2/1956 | Waite . |
| 3,092,420 | 4/1963 | Baldwin et al. . |
| 3,265,441 | 6/1964 | Baldwin . |
| 3,333,900 | 4/1965 | Aske, Jr. . |
| 3,397,918 | 1/1967 | Aske, Jr. et al. . |
| 3,397,921 | 2/1968 | Aske, Jr. . |
| 3,436,123 | 4/1969 | Aske, Jr. et al. . |
| 3,517,968 | 6/1970 | Tully et al. . |
| 3,549,204 | 12/1970 | Spisak . |
| 3,554,536 | 1/1971 | Richter . |
| 3,671,076 | 5/1972 | Aske, Jr. . |
| 3,894,775 | 7/1975 | Christoph et al. . |
| 4,291,921 | 9/1981 | Wulf . |
| 4,729,606 | 3/1988 | Narita et al. . |
| 4,895,414 | 1/1990 | Fleming et al. ............ 301/37.34 |
| 5,031,966 | 7/1991 | Oakey . |
| 5,083,841 | 1/1992 | Fleming ................... 301/37.35 |
| 5,222,785 | 6/1993 | Green ................... 301/37.35 X |

FOREIGN PATENT DOCUMENTS 793465 4/1958 United Kingdom ............ 301/37.38

*Primary Examiner*—Russell D. Stormer
*Attorney, Agent, or Firm*—Daniel M. Stock; Roger L. May

[57] ABSTRACT

A wheel and cover assembly for an automotive vehicle is provided which includes a resilient cushioning assembly positioned laterally intermediate a wheel covering disc and a vehicle road wheel. The cushioning assembly consists of a plurality of upstanding channels defined on the laterally inner face of the wheel cover disc into which is inserted a rubber cushioning member which includes a mounting portion for reliable retention by the channel and a ramp portion for effective engagement with the outer annular surface of the wheel.

11 Claims, 2 Drawing Sheets

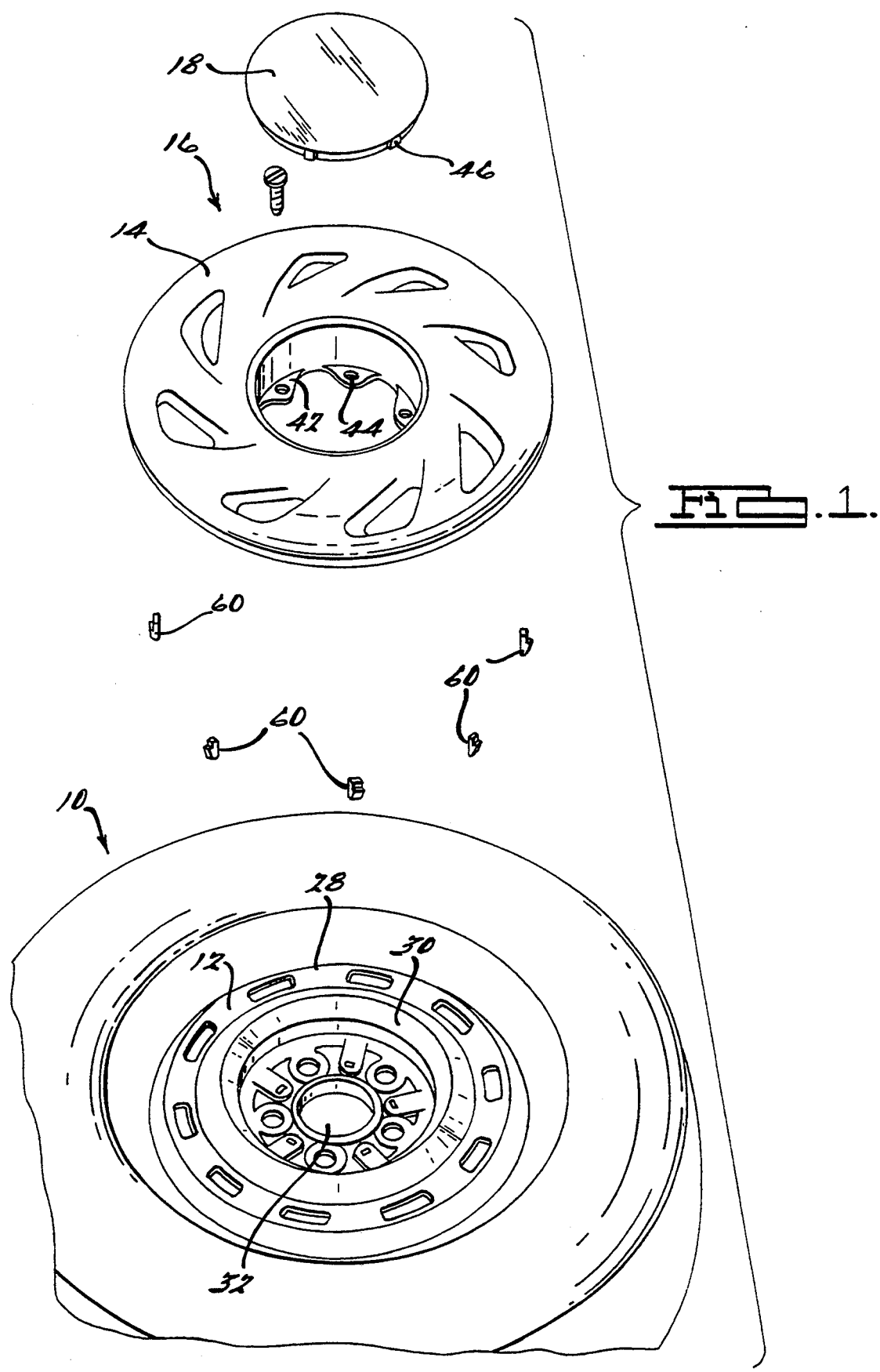

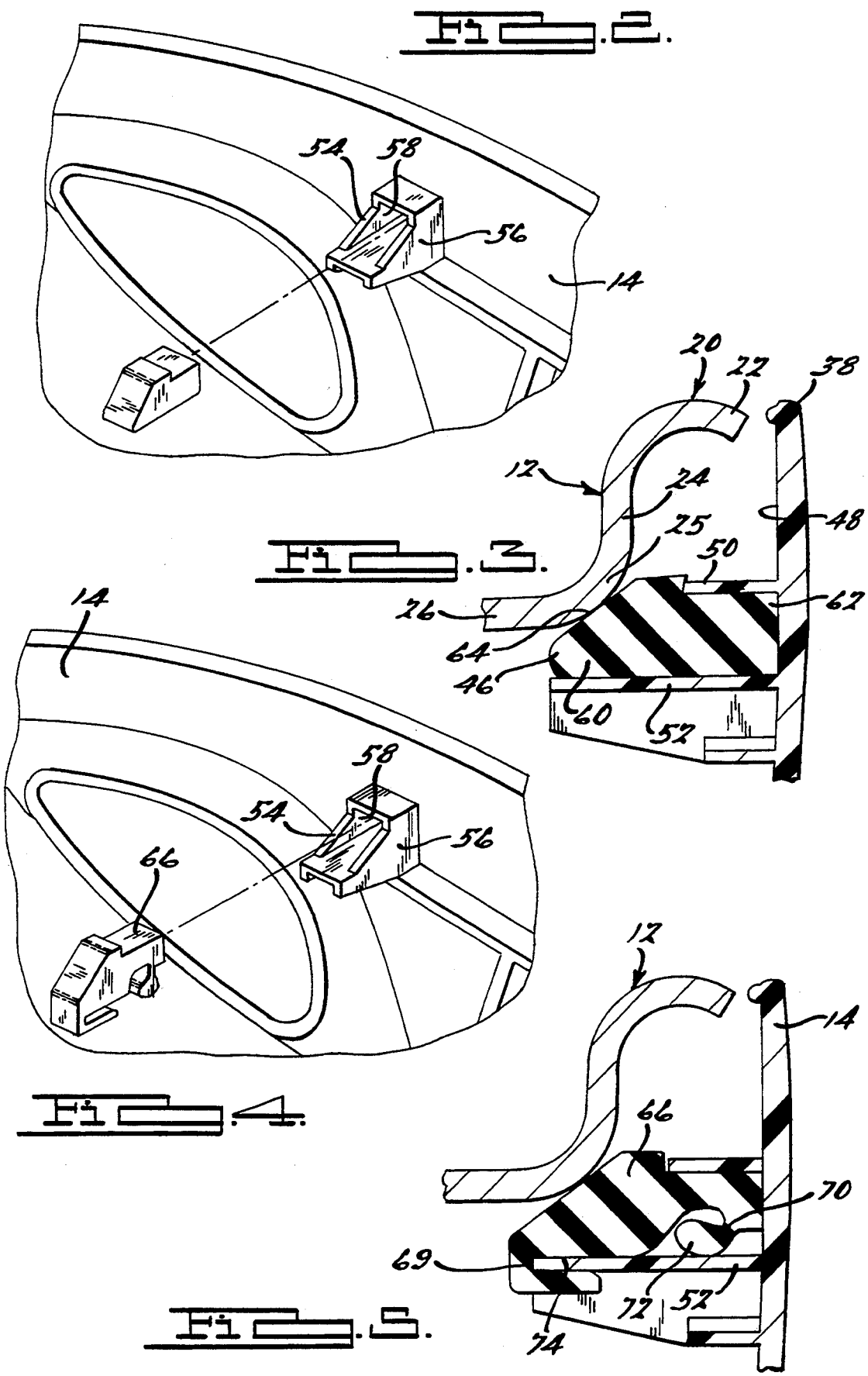

5,393,128

CUSHIONED WHEEL AND COVER ASSEMBLY

BACKGROUND OF THE INVENTION

In the design of trim parts for automotive vehicle wheels, lightweight flexible materials, such as plastics, are in wide-spread use. Because of the inherent flexibility of the parts fabricated from such materials it is necessary for the automotive designer to give careful attention to the prevention of squeaks and rattles generated at the interface between the plastic wheel trim and the metallic wheels on which the trim is mounted. In many instances, it is possible to effect a connective interface between the wheel trim and the wheel at the point at which styling considerations dictate the wheel trim and wheel being closest proximity. Typical of such designs is that in the common wheel cover situation in which clips or other connecting devices are positioned near the outer periphery of the wheel cover for engagement near the outer periphery of the wheel.

In some instances, however, the connective interface between the wheel and the trim is effected in another position such as radially inwardly toward the hub of the wheel. In such instances, a standoff device is generally formed on the annular surface of the wheel trim projecting toward the wheel to laterally locate and space the wheel trim with respect to the wheel. It is in such designs that squeaks and rattles tend to be experienced as the plastic standoff intermittently engages the adjacent portion of the wheel.

SUMMARY OF THE INVENTION

Responsive to the need to provide a wheel and cover assembly that avoids the generation of squeaks and rattles between the wheel cover and the wheel, the present invention provides a wheel and cover assembly which includes a covering disc which overlies the annular outer face of the wheel and provides a plurality of cushion members annularly arrayed on the disc which are abuttingly engagable with the wheel.

According to one aspect of the invention, the disc includes a plurality of channels formed on its annular face extending toward the wheel and the cushion members include a mounting portion received in the channel and a ramp portion for engagement with the wheel.

According to another aspect of the invention, the cushion member also includes a locking finger formed on the mounting portion to resist removal of the cushion member from the channel.

BRIEF DESCRIPTION OF THE DRAWINGS

The aforementioned advantages and features, as well as others, will be clear to those skilled in the automotive wheel trim art upon reading the following description with reference to the accompanying drawing, in which:

FIG. 1 is an exploded perspective view of the wheel and cover assembly according to the present invention viewed from the lateral outside of the vehicle wheel;

FIG. 2 is a partial lateral exploded perspective view of a portion of the vehicle wheelcover viewed from the inside;

FIG. 3 is a partial cross-section view of a wheel and cover assembly according to the present invention;

FIG. 4 is a view similar to FIG. 2 of an alternative embodiment of the wheelcover assembly according to the present invention; and FIG. 5 is a cross-section view similar to FIG. 3 of an alternative embodiment of the wheel and cover assembly of the present invention.

DESCRIPTION OF THE PREFERRED EMBODIMENTS

Turning now to drawings, and in particular to FIG. 1 thereof, a wheel and cover assembly indicated generally at 10 is illustrated and including a vehicle road wheel 12, a decorative covering disc 14 engagable in overlying relationship with respect to the road wheel 12, and including a fastening assembly indicated generally at 16 for releasably securing the disc 14 to the road wheel 12. The wheel and cover assembly 10 is also illustrated and including a hub cover 18 engagable with the disc 14 to cover the fastening assembly 16.

As may best be seen in FIGS. 3 and 5, the road wheel 12 is of the type that includes, near its outer periphery 20, a laterally outwardly turned flange portion 22, a generally annularly extending face portion 24, and an inturned portion 26. Notwithstanding the specific contour of the surfaces 22, 24, 26, collectively for purposes of this invention they are to be considered the laterally outward annular face indicated generally at 28. Also formed on the wheel 12 is a recessed central hub portion indicated generally at 30 through which is formed a central pilot aperture 32, a plurality of stud apertures 34 for mounting the road wheel 12 on the vehicle, and a plurality of trim mounting apertures 36. The trim apertures 36 may be integrally formed with the wheel 12 or may be in the form of an auxiliary member operatively secured to the wheel 12 in a known manner. The apertures are preferably threaded to form a portion of the fastening assembly 16.

The covering disc 14 is an annular disc-like member, preferably formed of a flexible plastic, and includes an outer peripheral portion 38 which overlies the outward turned flange portion 22 of the wheel 12 and is positioned in lateral proximity thereto. Radially inwardly spaced from the outer peripheral portion 38 is a recessed central hub portion 40 having a plurality of radially inwardly extending ears 42 having clearance apertures 44 formed therethrough. The recessed portion 40 is received in the recessed portion 30 of the wheel 12 and the clearance apertures 42 overlie the mounting apertures 36 of the wheel 12. Threaded insertion of a corresponding plurality of fasteners 44 through the apertures 42 into engagement with the apertures 36 effects releasable securement of the disc 14 to the wheel 12 in overlying relationship. The decorative effect of the resulting wheel and cover assembly is enhanced by the insertion of the cover 18 into snap-fit relationship through tabs, as indicated at 46, into the recessed portion 40.

Also included on the disc 14 are a plurality (one shown) of upstanding channels formed on the laterally innerface 48 of the disc 14. The channels each include a radially outer, short upper wall 50 and a radially longer inner wall 52. Laterally spaced sidewalls 54, 56 define a channel 58 for receiving a cushioning member 60 forming part of a cushioning assembly 19.

The cushioning member 60 includes a generally rectangular mounting portion 62 received within the channel 58 and includes a laterally inner ramp portion 64 for abuttingly engaging the laterally outer annular surface 28 of the wheel 12. The advantage of the ramp-like configuration of the ramp portion 64 can be appreciated in the illustrations of FIGS. 3 and 5 in which abutting engagement is effected at a curved portion indicated generally at 25 of the wheel 12. The ramp-like configuration effects self location in resilient engagement.

Turning now to FIGS. 4 and 5, an alternative embodiment of the invention wheel and cover assembly is illustrated in which like numbers refer to like parts and in which an alternative cushion member 66 is illustrated as including, in its generally rectangular mounting portion 68, a locking finger 70 having a canted portion 72 configured to permit inward insertion and resist outward withdrawal of the cushion member 66. The cushion member 66 also includes a slot 74 configured to receive the laterally inner end 69 of the radially inner wall 52 to enhance retention.

While only two embodiments of the wheel and cover assembly of the present invention have been described, others may be possible without departing from the scope of the appended claims.

What we claim and desire to secure by U.S. Letters Patent is:

1. A wheel and cover assembly for an automotive vehicle comprising:
   a road wheel having an annular lateral outer face;
   a disc overlying and substantially covering the wheel annular lateral outer face;
   means for releasably securing the disc to the wheel;
   means defining a plurality of channels on the annular lateral inner face of the disc and extending transversely thereto in juxtaposition with the wheel; and
   a plurality of cushion members carried in the channels abuttingly engagable with the wheel.

2. A wheel and cover assembly as defined in claim 1, wherein the cushion members are formed from rubber.

3. A wheel and cover assembly as defined in claim 1, wherein the cushion members comprise:
   a mounting portion slidingly received in the channel; and
   an angled ramp portion engaging the wheel.

4. A wheel and cover assembly as defined in claim 3, wherein the cushion members further comprise a locking finger formed on the mounting portion operative to resist removal of the cushion member from the channel.

5. A wheel and cover assembly as defined in claim 4, wherein the cushion member further comprises means defining the slot operative to receive a portion of the disc adjacent the channel in sliding engagement.

6. A wheel and cover assembly as defined in claim 2, wherein the disc is formed from plastic.

7. A wheel and cover assembly for an automotive vehicle comprising:
   a metallic road wheel having an annular outer face;
   a disc overlying and substantially covering the wheel annular outer face;
   means for releasably securing the disc to the wheel at a position substantially radially inwardly spaced with respect to the outer periphery of the disc;
   means defining a plurality of channels on the annular lateral inner face of the disc and extending transversely thereto in juxtaposition with the wheel; and
   a plurality of cushion members carried in the channels abuttingly engagable with the wheel.

8. A wheel and cover assembly as defined in claim 7, wherein the cushion member is formed from rubber.

9. A wheel and cover assembly as defined in claim 7, wherein the cushion member comprises:
   a mounting portion slidingly received in the channel; and
   an angled ramp portion engaging the wheel.

10. A wheel and cover assembly as defined in claim 9, wherein the cushion member further comprises a locking finger formed on the mounting portion operative to resist removal of the cushion member from the channel.

11. A wheel and cover assembly as defined in claim 7, wherein the disc is formed from plastic.

* * * * *